United States Patent [19]

Bannon

[11] Patent Number: 4,601,788
[45] Date of Patent: Jul. 22, 1986

[54] APPARATUS FOR FRACTIONATION REBOILING

[75] Inventor: Robert P. Bannon, Houston, Tex.

[73] Assignee: Shell Oil Company, Houston, Tex.

[21] Appl. No.: 632,496

[22] Filed: Jul. 19, 1984

Related U.S. Application Data

[62] Division of Ser. No. 397,640, Jul. 12, 1982, Pat. No. 4,490,215.

[51] Int. Cl.$^4$ .............................................. B01D 3/16
[52] U.S. Cl. ................................... 202/153; 202/158; 196/111; 203/94; 203/98
[58] Field of Search ............... 202/153, 158, 176, 163, 202/181; 203/98, 94, 6, 99, 7, 8, DIG. 25; 196/100, 111, 139; 208/349, 358

[56] References Cited

U.S. PATENT DOCUMENTS

| | | | |
|---|---|---|---|
| 2,071,643 | 2/1937 | Maker | 208/361 |
| 2,398,213 | 4/1946 | Dutson et al. | 208/358 |
| 2,534,173 | 12/1950 | Kraft | 202/153 |
| 2,795,536 | 6/1957 | Grossberg et al. | 202/153 |
| 2,845,444 | 7/1958 | Thomson | 202/158 |
| 3,119,764 | 1/1964 | Cabbage | 202/153 |
| 3,766,021 | 10/1973 | Randall | 208/358 |

FOREIGN PATENT DOCUMENTS 45706  4/1981  Japan ................................. 202/153

OTHER PUBLICATIONS

Kister, H.: *Outlets and Internal Devices for Distillation Columns;* Chemical Engineering, Jul. 28, 1980, pp. 79-83.

*Primary Examiner*—Wilbur Bascomb
*Attorney, Agent, or Firm*—Ronald R. Reper

[57] ABSTRACT

A distillation method and apparatus which comprises (a) a distillation zone adapted for the countercurrent contact of liquid and vapor, (b) a reboiler feed liquid compartment (c) means for directing distillation zone liquid into the reboiler liquid feed compartment, (d) a thermosyphon reboiler for partial vaporization of liquid thereto to produce reboiled vapor and liquid flows, (e) a conduit for the flow of liquid from the reboiler liquid feed compartment to the reboiler, (f) a reboiler return liquid compartment, (g) a conduit for the flow of reboiled liquid from the reboiler to the reboiler return compartment, (h) a conduit for the flow of reboiled vapor from the reboiler to the distillation zone, (i) means for communication of liquid by gravity flow between the reboiler feed compartment and the reboiler return compartment to provide substantially equal liquid levels in the two reservoirs, (j) a distillation zone liquid product compartment, (k) means for overflow of liquid from the reboiler return compartment to the product compartment to maintain a substantially constant level of liquid in the reboiler return compartment, and (l) means for withdrawal of liquid product from the product compartment.

6 Claims, 3 Drawing Figures

APPARATUS FOR FRACTIONATION REBOILING

This is a division of application Ser. No. 397,640, filed July 12, 1982, now U.S. Pat. No. 4,490,215.

BACKGROUND OF THE INVENTION

This invention relates to a method and apparatus for improving the stability of operation in the thermosyphon reboiling of a fractionation liquid residue by arranging the bottom zone of the fractionator column into a specific configuration of compartments and baffles.

Distillation processes are widely used in the chemical and petroleum industries for separation of components of a liquid mixture by partial vaporization of the mixture and separation of the vapor containing the more volatile components from the residue containing the less volatile components. Accordingly, knowledge concerning the design and operation of fractionation columns is possessed by persons skilled in the art and has been made available in a great many references, including for example, the Chemical Engineers Handbook (Fourth Edition) published by McGraw-Hill Book Co., New York, N.Y. Additional prior art is represented by U.S. Pat. No. 2,134,836 illustrating the use of fractionation trays and reboiler systems and U.S. Pat. No. 2,398,213 illustrating a fractionation column adapted for reducing thermal decomposition in high temperature accumulators. U.S. 3,766,021 illustrates a fractionation column adapted for use with heavy immiscible residues in the feed system arranged to prevent or limit their contact with the reboiler.

SUMMARY OF THE INVENTION

The invention provides a process for improving the stability of operation of a fractional distillation system having an upright vapor-liquid contacting fractionator, which process comprises:

collecting substantially all of the down-flowing liquid from the bottom vapor-liquid contacting means in a reboiler feed compartment, withdrawing said liquid of said reboiler feed compartment for reboiling, passing the resulting partially vaporized liquid to a reboiler return liquid compartment, equalizing the liquid level in the reboiler feed compartment and the reboiler liquid return compartment via means for liquid communication between said compartments, and overflowing liquid from the reboiler liquid return compartment to a fractionator bottoms product compartment.

The invention further provides an apparatus for fractionating chemical compounds which comprises:

(a) an enclosed upright vessel having an upper end and a lower end and an internal volume, (b) an inlet conduit communicating with said internal volume at a point intermediate the upper and lower ends of the vessel, (c) a bottoms fraction outlet conduit communicating with said internal volume at about the lowermost elevation of the vessel, (d) a distillate outlet conduit communicating with said internal volume at the upper end of the vessel, (e) vapor-liquid contacting means operatively distributed within the internal volume of said vessel, (f) a first liquid compartment disposed within said vessel below the bottom vapor-liquid contacting means, (g) collecting means for passing substantially all of the downflow liquid from the bottom vapor liquid contacting means into said first liquid compartment, (h) thermosyphon reboiling means operatively associated with the lower end of the internal volume of the vessel, (i) means for removing liquid from said first liquid compartment and passing said liquid to the reboiler said means comprising a first conduit connected to the boiler and to the lower portion of said first liquid compartment, (j) a second liquid compartment disposed within said vessel at an elevation overlapping that of the first compartment, having means for fluid communication between said first compartment and said second compartment said second compartment having liquid overflow means at an elevation intermediate said fluid communication means and the liquid overflow level of said first compartment, for overflowing liquid from said second compartment into the lower end of the vessel, and (k) means for passing fluid from the reboiler to the vessel, said means comprising a second conduit connected to the reboiler and to the outer wall of the vessel and being disposed to pass liquid to the upper part of said second liquid compartment.

DESCRIPTION OF PREFERRED EMBODIMENTS

Figure 1:
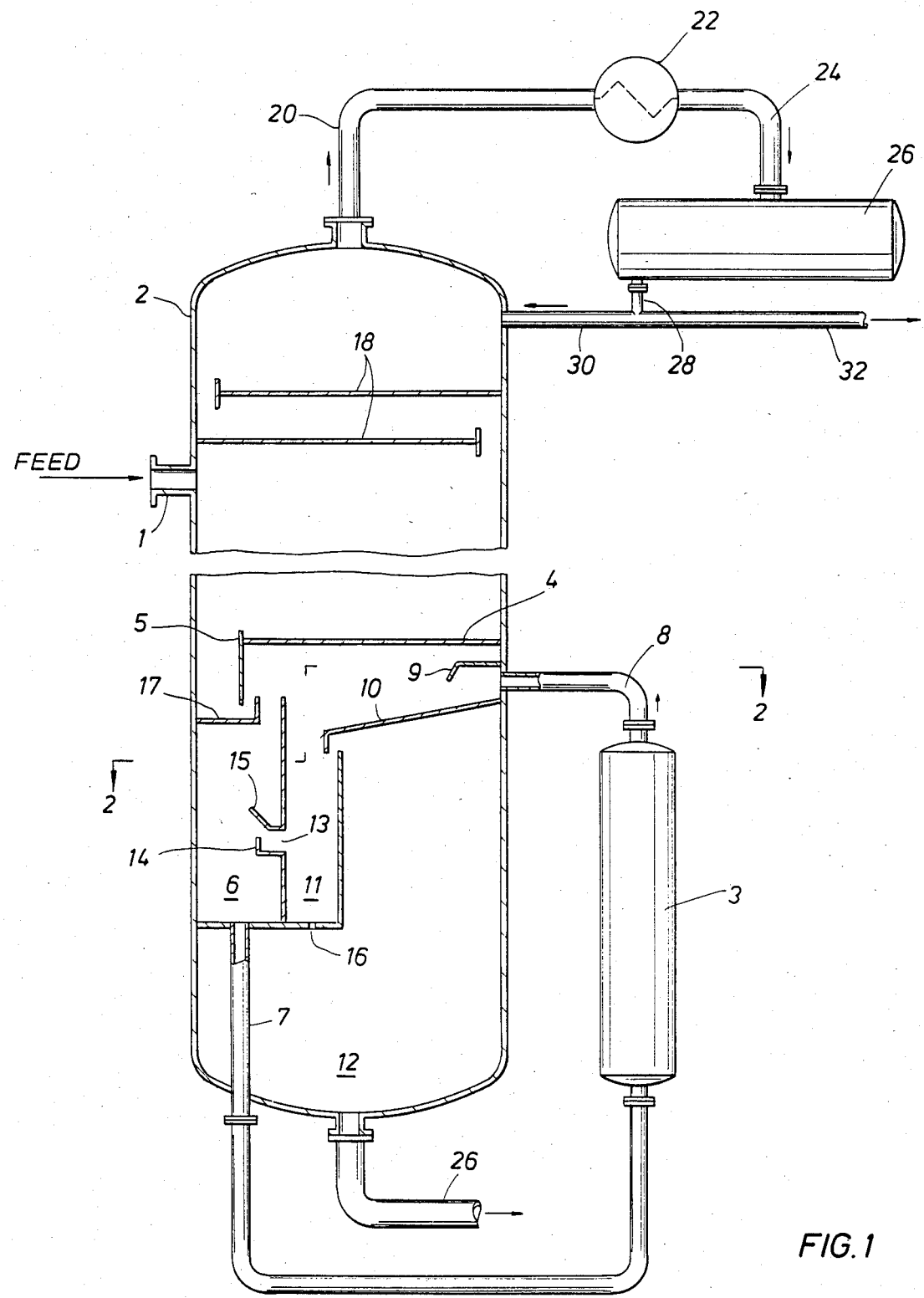
FIG. 1 presents a schematic drawing of a fractionation distillation system of the present invention.

The distillation process and apparatus according to the invention is applicable to the distillation and fractionation of any distillable or fractionable material such as, for example, animal, mineral or vegetable oils and distillate organic and inorganic chemical mixtures or solutions. It is well suited for fractionation of hydrocarbon oils as may be obtained from crude petroleum, or synthesized from e.g., carbon oxides and hydrogen, and is particularly well suited for thermally unstable fractionable materials such as olefins since it features no reboiler bypassing enabling lower reboiler temperatures compared to conventional design.

In the subject invention the feed stream enters the upright, i.e. vertically aligned fractionation column at an elevation above the compartments hereinafter described and is above collecting means to direct substantially all downflowing liquid into a first reboiler feed compartment. The column is reboiled in a customary manner through the use of an internal or external reboiler. Heat is removed also in a conventional manner at the top of the column e.g., by a stabbed-in condenser or an external condenser in an overhead vapor line. The column is maintained at fractionation conditions selected to separate the feed stream into at least one distillate (overhead) product stream and a residual (bottoms) stream of different composition. Where desired the column may contain a plurality of vapor liquid contacting materials and/or structures such as single pass or multi-pass fractionation plates or trays, and a plurality of side draws for withdrawing other desired distillate fractions of the feed to the column.

When the fractionation system according to the invention is employed as a fractionating column, typically there will be vapor liquid contacting means disposed in the column both above and below the feed inlet and condensing means operatively associated with the upper part of the column. In an embodiment for service as a reboiled stripper, typically vapor liquid contacting means will be disposed in the column only below the feed inlet, and usually condensing means will be omitted. In an embodiment for service as a reboiled absorber typically there would be no vapor liquid contacting means disposed in the column below the feed inlet, but only collecting means for directing feed liquid to the first (reboiler feed) compartment, such collecting means as e.g., a chimney tray; condensing means would usually be omitted.

A broad range of fractionation conditions includes a pressure of from subatmospheric to about 180 bar and a bottoms temperature of from about $-100°$ C. to about $+350°$ C. Preferred fractionation conditions include a pressure in the range from about 0.5 to 35 bar and a bottoms temperature in the range from about 100° to about 280° C. The reflux ratio preferably is in the range from about 0.1:1 to about 10:1. Other conditions such as vapor velocity, liquid loadings and tray designs may be selected by those skilled in the art for the particular fractionation application.

Figure 3:
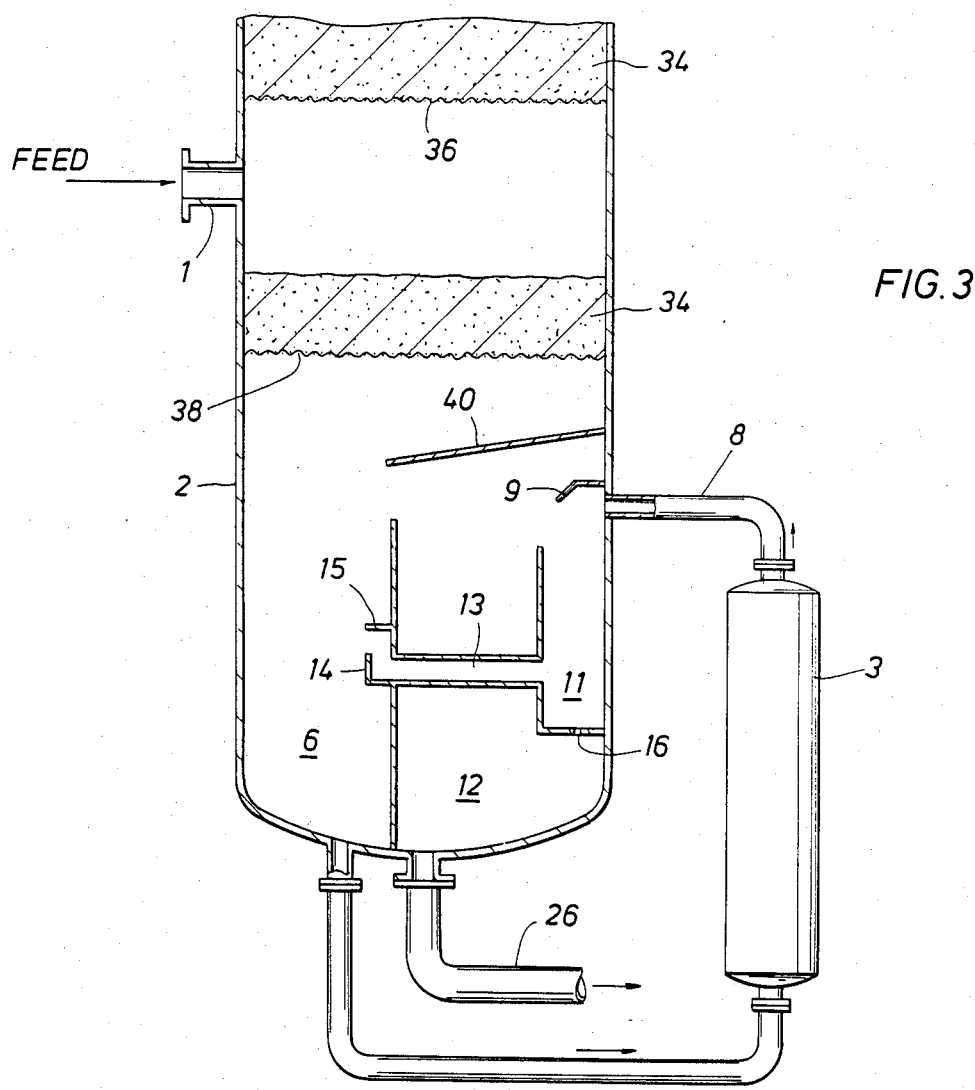
FIG. 3 is a schematic drawing of the lower portion of another embodiment of the invention.

A preferred embodiment of the invention is shown in FIG. 1. A feed stream such as gas oil fraction from a hydrocarbon cracking unit enters a vertically aligned trayed fractionation column 2 through line 1. This column is maintained at conditions required for fractionation of the feed stream by vaporization in reboiler 3 of liquid from bottom tray 4 passed via downcomer means 5 and liquid seal pan 17 into liquid (reboiler feed) compartment 6 and carried to the reboiler by conduit 7. Downcomer means 5 may have a conventional seal pan as shown or may extend below the liquid level in compartment 6. As will be appreciated by those skilled in the art, conduit 7 could exit the sidewall of the vessel instead of the bottom, if desired, for example to minimize piping to a short reboiler. The at least partially vaporized liquid from reboiler 3 is returned to the column via conduit 8. Optional deflector plate 9 directs the liquid portion of the reboiler return stream toward baffle means 10 which carries the liquid to a second liquid (reboiler return) compartment 11. Baffle means 10, which may be level or sloping, is disposed to also direct any weepage from that portion of the bottom tray 4 which is directly above the baffle into the reboiler return compartment. A major portion of the return liquid overflows the return compartment 11 into the bottoms product compartment 12. The reboiler return compartment will normally be full and overflowing. Communication means 13, disposed above the lowermost elevation up to about the upper level in the return compartment, provides a path for return liquid to the reboiler feed compartment 6 and assures that levels are constant and essentially the same in both compartments. Such communication means may comprise an aperture but preferably is a horizontal slot in the common wall when the reboiler feed compartment 6 and reboiler return compartments are adjacent as shown, or when the compartments are separated as shown in FIG. 3 may comprise a conduit.

During atypical operations where the flow of liquid from bottom tray 4 is greater than flow to the reboiler, liquid will flow through communication means 13 from the reboiler feed compartment 6 into return compartment 11. Constant level in both compartments is still maintained by the liquid overflowing the return compartment 11 to the bottoms product compartment 12.

In a preferred embodiment communication means 13 is provided with at least one baffle means such as trap 14 to minimize convection flow between the two compartments (the liquids are usually of slightly different density). Also desirable is an optional deflection baffle 15 above communication means 13 to reduce or prevent disturbance to flow in communication means from entry of the downcoming fluid from bottom tray 4.

In a particularly preferred embodiment the reboiler return compartment has one or more small apertures in the bottom of the compartment to pass a minor portion of the liquid and purge any solid particles such as scale, degradation products and the like into product compartment 12. In effect then the zone in the reboiler return compartment 11 which is below the elevation of communication means 13 is a settling zone. The combination of settling zone and purging of dense material and solid particulates removes such materials from the reboiler loop. Otherwise, corrosion products, silt introduced with column feed, fouling deposits and the like would tend to be trapped in the reboiler feed and return loop, which, in many cases would lead to increased reboiler fouling.

The top of the fractionating tower operates in a conventional manner. Vapors containing the lower boiling components of the feed stream rise through a plurality of fractionation trays 18 and are removed as an overhead vapor stream carried by line 20. This vapor stream is passed through a condenser 22 and then directed via line 24 into an overhead receiver 26. Uncondensed vapors, if any, are removed by a line not shown. The condensed overhead liquid is drained in line 28 and divided into a reflux stream carried by line 30 and a net overhead product stream removed in line 32.

The higher boiling components of the feed which have collected in the lower end of the fractionation column in bottoms product compartment 12 are withdrawn by conduit 26 located at about the lowermost elevation of the vessel.

Figure 2:
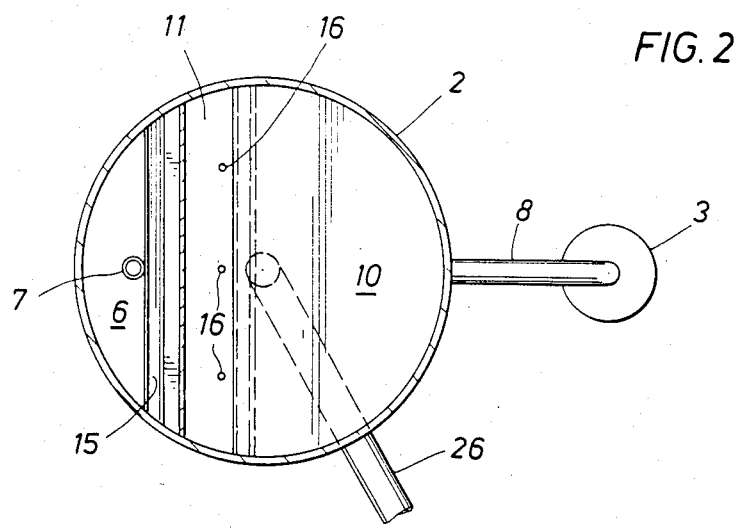
FIG. 2 is a cross-sectional view of the column of FIG. 1 along line "2—2" and presents the view seen looking downward toward the bottom immediately above the reboiler return.

FIG. 2 presents a cross-section of the column 2 of FIG. 1 taken along section line 2—2 looking downward at reboiler feed compartment 6, reboiler return compartment 11 and baffle collection means 10. Downcoming liquid from bottom tray 4 is collected in compartment 6, and passed by conduit 7 to reboiler 3 and returned to column 2 by conduit 8. The unvaporized portion of the returned liquid is collected and directed by baffle means 10 into return compartment 11. A small portion of the returned liquid is purged into the underlying product compartment, not shown, via apertures 16 in the bottom of the return compartment. Liquid may pass through fluid communication means not shown to maintain substantially common liquid level in the reboiler feed compartment and the reboiler return compartment. Substantially, constant level is maintained by liquid overflowing the reboiler return compartment into the bottom product compartment.

FIG. 3 represents a different mechanical embodiment of the invention. FIG. 3 is a cross-sectional view of a portion of a packed column in which the same numbers designate elements common with those in FIGS. 1 and 2. In this embodiment, the vapor-liquid contacting means comprises a commercially available packing material 34 operatively disposed within the inner volume of the fractionation vessel 2, at points above and below the inlet conduit. An upper bed of packing is held above the feed inlet 1 by a horizontal screen 36 which conforms generally to the inner surface of the vessel. A lower bed of packing is positioned below the feed inlet 1 and held above the lower end of the vessel by a similar horizontal screen 38. The feed enters the column and decends through the packing counter current to rising vapors. Liquid descending through screen falls either directly into reboiler feed compartment 6 or upon baffle means 40 for passing substantially all of downflow liquid falling upon it into said reboiler feed compartment.

The size of the reboiler feed and return compartments will depend upon the specific application. In general, the superficial vertical velocity in each compartment should be less than 10 centimeters per second and preferably less than 5 centimeters per second. The height of liquid in the compartments above the fluid communication means 13 is preferably great enough to suppress vaporization upon mixing of the two liquids when there is flow of liquid from the reboiler return compartment 11 into reboiler feed compartment 6. The particular arrangement best suited to a given application will be determined in large measure by the length of the reboiler and the amount of surge volume required in the bottoms product compartment 12.

The vessel arrangement below the vapor liquid contacting means in FIG. 1 applies for long reboilers and relatively high bottoms product surge volume; in FIG. 3 for relatively small bottoms product surge regardless of reboiler size.

As will be appreciated by those skilled in the art, there are many advantages according to the invention. Some of these include: that the liquid descending from the bottom vapor-liquid contacting means is preferably fed to the reboiler enabling the use of the lowest reboiler temperature and highest degree of staging in the reboiler for a given reboiler feed rate; the relatively constant level in the reboiler feed compartment stabilizes the circulation rate through the reboiler loop for thermosyphon reboilers; and in trayed columns virtually all tray weepage is caught and potentially can reach the reboiler, enabling the fractionation column to operate at a very low fraction of normal load, i.e. a very high turndown ratio, regardless of the design or condition of the bottom tray. This feature avoids the requirement for special start procedures often required with thermosyphon reboilers. Further advantages include: that particulates are continuously purged from the reboiler circulation loop; the length of piping in reboiler loop is reduced; in the arrangement of FIG. 1 the height of the bottoms products compartment may be reduced for a given bottoms surge volume enabling a reduction in overall column height; and multiple reboilers (not shown) can easily be accomodated with no loss in these advantages. Finally, the invention is especially advantageous for fractionation of thermally unstable materials since the features of no reboiler bypassing, lower reboiler temperatures and purging of particulate and decomposition products from the reboiler circulation loop result in improved performance compared to conventional designs.

The following illustrative embodiment, based upon calculated results will serve to provide a fuller understanding of the invention, however is not to be interpreted as limitative of the invention. A conventional fractionation distillation tower equipped with an external thermosyphon reboiler is used to "split" a full boiling range naphtha fraction into a light naphtha fraction substantially boiling at atmospheric pressure at temperatures less than 93° C. and a less volatile heavy naphtha fraction substantially boiling at atmospheric pressure at temperatures above 93° C. The column is operated at 1.72 bar at a feed rate of 44,000 Barrels per day (B/D). The column is operated with 20,500 B/D reflux and results in the separation of 17,000 B/D of light naphtha as overhead; 27,000 B/D of heavy naphtha is removed as bottoms at a temperature of about 143° C. The feed to the thermosyphon reboiler is taken from the surge volume near the bottom of the column at 143° C. through the reboiler having a reboiler duty of forty million BTU's per hour, and is returned to the column above the surge volume at a temperature of about 150° C. This outlet temperature will vary somewhat as the liquid level in the surge volume of the column fluctuates.

When the above column is equipped with the system of compartments and conduits according to the invention as shown in FIG. 1, it is found that the temperatures of the feed to the reboiler is 135° C. and the temperature of the effluent from the reboiler is 143° C., i.e. 7° C. lower. Moreover the constant level in the reboiler feed compartment steadies the temperatures in the column, permitting stable operation irrespective of fluctuations in the surge volume.

I claim:

1. An apparatus for fractionating chemical compounds which comprises:
   (a) an enclosed upright vessel having an upper end and a lower end and an internal volume,
   (b) an inlet conduit communicating with said internal volume at a point intermediate the upper and lower ends of the vessel,
   (c) a bottoms fraction outlet conduit communicating with a bottoms product compartment disposed within said internal volume at about the lower elevation of the vessel,
   (d) a distillate outlet conduit communicating with said internal volume at the upper end of the vessel,
   (e) vapor-liquid contacting means operatively distributed within the internal volume of said vessel,
   (f) collecting means disposed below said vapor-liquid contacting means for passing substantially all of the downflow liquid from the bottom vapor liquid contacting means into a first liquid compartment,
   (g) a first, reboiler feed, liquid compartment disposed within said vessel below the bottom vapor-liquid contacting means to collect substantially all of the down flow from the bottom vapor-liquid collecting means,
   (h) thermosyphon reboiling means operatively associated with the lower end of the vessel,
   (i) means for removing liquid from said first liquid compartment and passing said liquid to the reboiler said means comprising a first condiut connected to the reboiler and to said first liquid compartment,
   (j) a second, reboiler return, liquid compartment disposed within said vessel at an elevation overlapping that of the first compartment, to collect substantially all of the liquid from the reboiler to the vessel, and having means for fluid communication between said first compartment and said second compartment, said second compartment having liquid overlow means at an elevation above said fluid communication means for overflowing liquid from said second, reboiler return compartment into said bottom product compartment disposed in the lower end of the vessel, and (k) means for passing fluid from the reboiler to the vessel, said means comprising a second conduit connected to the reboiler and to the outer wall of the vessel and being disposed to pass liquid to the upper part of said second liquid compartment.

2. Apparatus as in claim 1 wherein the second liquid compartment contains at least one aperture disposed in the bottom of said 3. Apparatus as in claim 1 wherein the means for fluid communication between said first liquid compartment and the second liquid compartment comprises baffle means operatively associated therewith for reducing convection flow between said first compartment and said second compartment.

4. Apparatus as in claim 1 wherein the vapor-liquid contacting means comprises a high surface area packing material.

5. Apparatus as in claim 1 wherein the vapor-liquid contacting means comprise fractionation trays.

6. Apparatus as in claim 1 wherein the vapor-liquid contacting means is operatively distributed at points above and below the inlet conduit.

* * * * *